US012208553B2

(12) United States Patent
Vázquez García et al.

(10) Patent No.: US 12,208,553 B2
(45) Date of Patent: Jan. 28, 2025

(54) CONTROL METHOD AND HIGH-SPEED FLUID INJECTION SYSTEM

(71) Applicant: ACTEGA ARTÍSTICA, S.A.U., Pontevedra (ES)

(72) Inventors: Ismael Vázquez García, A Coruña (ES); José Trigo Collazo, Pontevedra (ES); Enrique Paz Domonte, Pontevedra (ES); Miguel Ramón Diaz-Cacho Medina, Pontevedra (ES); Ricardo Lourido Santoro, Pontevedra (ES); Carlos Pérez Betanzos, Pontevedra (ES); Eduardo Alonso Mora, Pontevedra (ES)

(73) Assignee: Actega Artistica, S.A.U., Pontevedra (ES)

( * ) Notice: Subject to any disclaimer, the term of this patent is extended or adjusted under 35 U.S.C. 154(b) by 116 days.

(21) Appl. No.: 17/904,102

(22) PCT Filed: Jul. 1, 2021

(86) PCT No.: PCT/EP2021/068193
§ 371 (c)(1),
(2) Date: Aug. 11, 2022

(87) PCT Pub. No.: WO2022/003108
PCT Pub. Date: Jan. 6, 2022

(65) Prior Publication Data
US 2023/0330905 A1    Oct. 19, 2023

(30) Foreign Application Priority Data
Jul. 1, 2020  (EP) .................... 20382586

(51) Int. Cl.
B05C 5/02    (2006.01)
B29C 45/77   (2006.01)

(52) U.S. Cl.
CPC .... *B29C 45/77* (2013.01); *B29C 2945/76056* (2013.01); *B29C 2945/7621* (2013.01);
(Continued)

(58) Field of Classification Search
CPC ................. B05C 5/0225; B29C 45/77; B29C 2945/76056
See application file for complete search history.

(56) References Cited

U.S. PATENT DOCUMENTS 5,215,587 A    6/1993  McConnellogue et al.
6,010,740 A    1/2000  Rutledge et al.
(Continued)

FOREIGN PATENT DOCUMENTS

EP    0192166 A2    8/1986
EP    1890118 A2    2/2008
(Continued)

OTHER PUBLICATIONS

International Search Report and Written Opinion of the International Searching Authority for International Application No. PCT/EP2021/068193, mailed on Sep. 1, 2021, in 16 pages.
(Continued)

*Primary Examiner* — James Sanders
(74) *Attorney, Agent, or Firm* — Knobbe, Martens, Olson & Bear, LLP

(57) ABSTRACT

The present invention relates to a control method for a high-speed fluid injection system and a system configured for implementing the control method. Similarly, the invention has a monitoring system for the system configured for implementing the control method. In particular, the present invention allows automatically, precisely, and continuously controlling the amount of fluid injected or applied to a plurality of parts.

15 Claims, 6 Drawing Sheets

(52) U.S. Cl.
CPC ............... *B29C 2945/76381* (2013.01); *B29C 2945/76484* (2013.01); *B29C 2945/76545* (2013.01); *B29C 2945/76688* (2013.01); *B29C 2945/76859* (2013.01); *B29C 2945/76933* (2013.01)

(56) References Cited

U.S. PATENT DOCUMENTS

| | | |
|---|---|---|
| 2017/0168471 A1 | 6/2017 | Burns et al. |
| 2018/0056567 A1 | 3/2018 | Altonen et al. |
| 2019/0070762 A1 | 3/2019 | Altonen et al. |

FOREIGN PATENT DOCUMENTS

| | | |
|---|---|---|
| EP | 3499194 A1 | 6/2019 |
| WO | WO 02/074516 A1 | 9/2002 |

OTHER PUBLICATIONS

Abel, D._RWTH Univerity Lectures Notes, Control Engineering and Supplements, 42nd Edition, 2018, with translation, 93 pages.

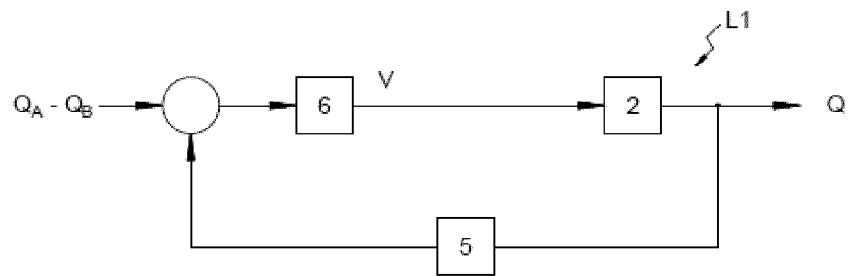
Fig 1.a
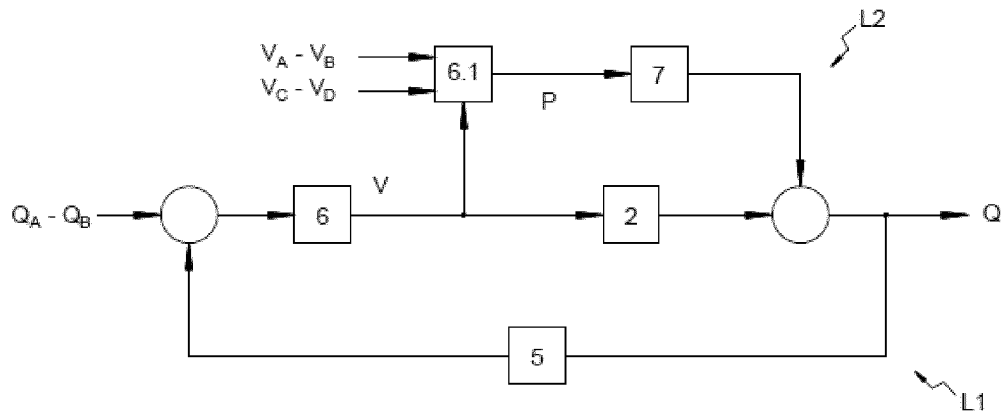
Fig 1.b
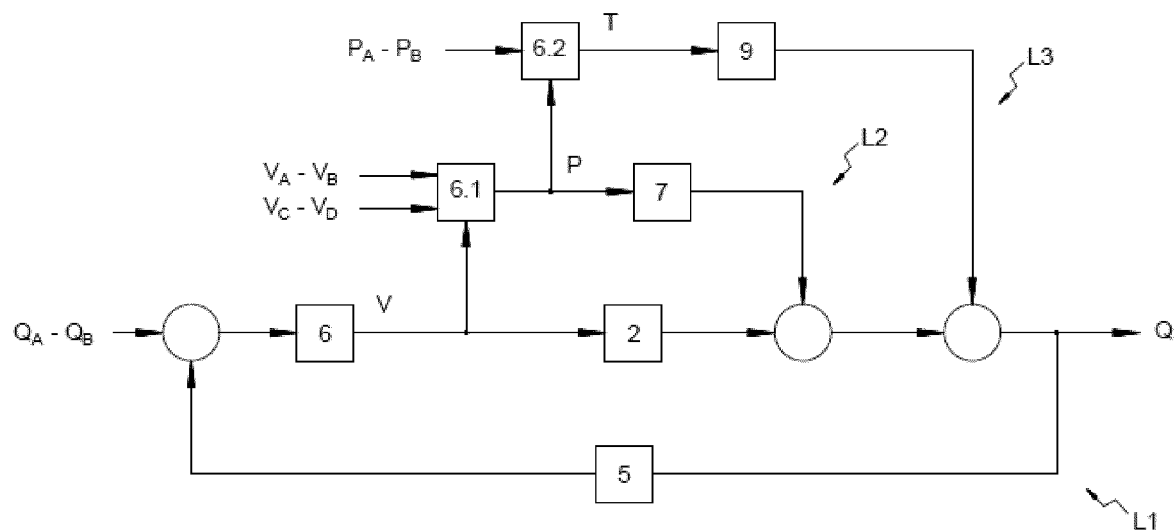
Fig 1.c

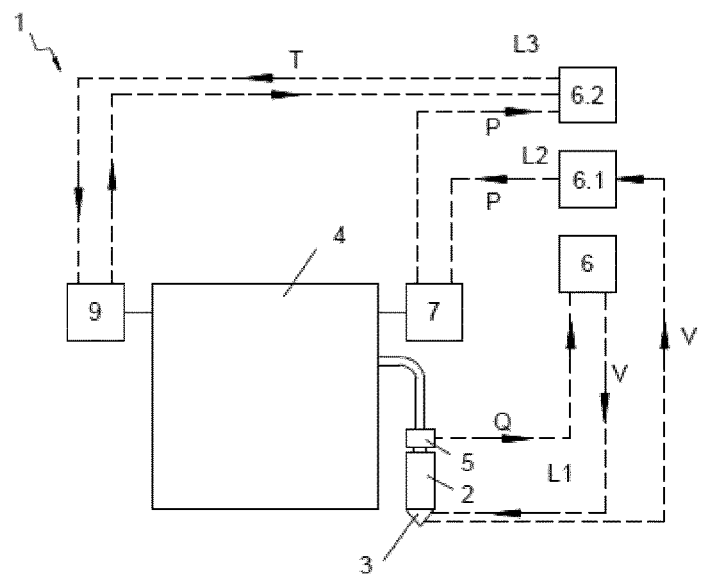
Fig 5
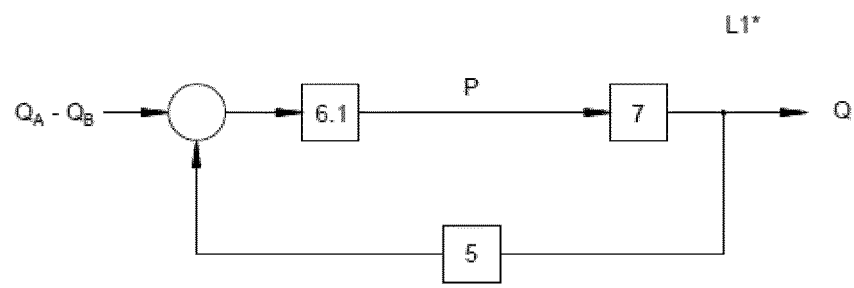
Fig 6.a
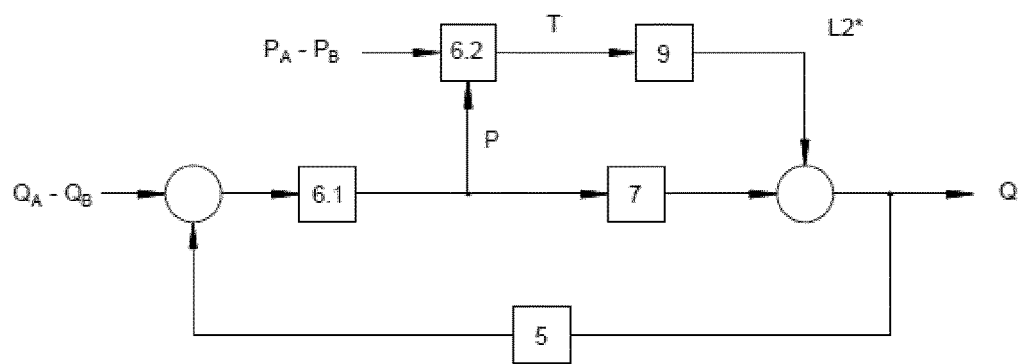
Fig 6.b

CONTROL METHOD AND HIGH-SPEED FLUID INJECTION SYSTEM

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57.

OBJECT OF THE INVENTION

The present invention relates to a control method for a high-speed fluid injection system and a system configured for implementing the control method. The invention also has a monitoring system for the system configured for implementing the control method. In particular, the present invention allows automatically, precisely, and continuously controlling the amount of fluid injected or applied to a plurality of parts.

BACKGROUND OF THE INVENTION

The growing market demand for products and the implementation of more productive processes have opened up new fields for improving process efficiency in the container manufacturing sector. Today, production processes with the greatest potential for improvement in this sector are perhaps processes of applying fluids on containers components, such as bodies and lids. Most of the fluids that are applied are adhesives, sealants, or varnishes, consisting of dispersions in an organic or aqueous solvent of the solid product that is to be applied on a surface of the component.

In these processes, after applying the fluid in liquid state on a surface of the component, the solvents volatilize and leave on the surface of the component a solid product or dry extract, which is the name used to refer to the part of the fluid that remains after removing the solvent. In the case of sealants, for example, the dry extract volume has an effect on the free space remaining in the closure of a container: an excessive amount of dry extract can prevent proper closure, whereas an insufficient amount may cause the content of the container to leak or be contaminated. Therefore, the dry extract volume of the applied sealant is considered a critical parameter for ensuring container closure integrity.

To meet specific dry extract volume requirements, consideration must be given, on one hand, to the parameters of the fluid itself, such as the density and the solvent: solid product ratio; however, attention must be given particularly to the amount of liquid fluid that is applied on the surface of each part or component.

To be efficient and profitable, the processes of applying fluids, particularly of applying sealants, on containers components such as lids require large production volumes and high processing capacities. Precision in the amount of applied fluid is key for obtaining lids according to specifications.

Generally, stationary or rotary fluid injection machines with one or more injection devices are used in these application processes, with said devices applying amounts of sealing fluid in the order of milligrams on one or more parts moving at high speed in the production line.

In stationary machines, the injector or injectors are fixed, whereas the lids move in an indexed manner, remaining in the application station for the corresponding time to be treated by the injector. In rotary machines, the injectors are assembled to rotate about the rotation axis of the machine, such that they accompany the lids during the application process. In these rotary machines, the parts enter the machine by means of a feeder which conveys them, describing a circle with respect to the machine axis. Each part is treated by an injector while it moves such that several injectors simultaneously apply the fluid on their respective parts.

In both stationary machines and rotary machines, round lids must be differentiated from non-round or shaped lids during the injection application process. To distribute the fluid that is applied, such as in the case of sealants, on the entire perimeter of the lid or closure area, for round lids, the lid rotates with respect to the axis of the injector during the application process, whereas for non-round or shaped lids, the injector moves following the perimeter of the lid to deposit the sealant in the closure area. The sealing fluid can thereby be spread in the closure area of the lid in one or more layers depending on the number of turns the lid or the injector makes during the application process.

Taking into account that these application processes are high-speed processes, it is very important for the speed of response of the injection devices (or injectors) to be in the order of milliseconds and for the process capacity to remain the same over time so as to maintain an acceptable production rate, since the parts are applied in line and in a continuous manner. In the known systems, the trade-off for maintaining a high production rate is the imprecision in the amount of fluid that is applied on each part. In fact, it is a process that can be considered uncontrollable due to the attainment of capability indices that are well below those desired or considered acceptable for the process to be referred to as being under control.

During the application process, there are factors that are not currently under control and cause the amount of fluid applied throughout the process to vary considerably. Variations in the geometry of the injector due to wear or misalignments, variations in temperature, variations in the viscosity of the applied fluid, are some of the factors affecting the flow rate of the fluid applied by the injector and causing the applied amount to vary during the process.

At present, the only control tool of widespread use in the sector is a manual control method which requires randomly weighing several samples of a batch. This method is generally performed every few hours after the fluid has been applied on a large number of parts (production rates of more than 2000 units/min can be achieved), and if a deviation with respect to the specified amount is detected, the batch must be disposed of, and the operator performing the control must manually adjust the production parameters to correct the deviation. Furthermore, this control method is highly dependent on the experience and skill of each operator for weighing the parts and adjusting the process parameters.

There is therefore a need in the industry to implement effective and efficient methods and systems for controlling the amount of applied fluid that meet the current demands of the sector.

Document WO02/074516A1 discloses an apparatus and method for proportionally controlling fluid delivery to stacked molds.

Patent application EP3499194A1 refers to a flow measuring system adapted for measuring a flow rate of sealant applied to a plurality of parts, the flow measuring system comprising a plurality of flowmeters, each of the flowmeters in fluid communication with a fluid injector, and the plurality of flowmeters being configured to generate, process and transmit a signal related to the flow rate of the injected fluid.

Document US2019/070762A1 describes systems and methods for autotuning PID control of injection molding machines, in order to reduce oscillations in process variables of an injection molding process.

Patent application US2017/168471A1 discloses a remote controller for controlling apparatus by diverting feedback signal from native controller to the remote controller. A remote controller can be provided on any apparatus that employs feedback control from a native controller to add functionality to the apparatus where the native controller is not capable of providing such functionality independently.

Document US2018/056567A1 describes an injection molding system with discretely-adjustable variable control to effectively control its operation.

DESCRIPTION OF THE INVENTION

The present invention proposes a solution to the preceding problems by means of a control method for a fluid injection system according to claim 1, a high-speed fluid injection system according to claim 8, and a monitoring system according to claim 14. The dependent claims define preferred embodiments of the invention.

A first inventive aspect provides a control method for a high-speed fluid injection system, comprising:

- a plurality of fluid injectors, each fluid injector comprising a valve element movable between a first closing position and a second open position, wherein the second open position of each valve element can be individually controlled to regulate the flow rate injected by each fluid injector;
- fluid feeding means configured for supplying pressurized fluid to the plurality of fluid injectors;
- a plurality of flowmeters, wherein each flowmeter is linked to a fluid injector, and wherein each flowmeter is configured for measuring the flow rate of the fluid injected by the fluid injector to which it is linked;
- a first control device, configured for receiving a signal of the flow rate of each fluid injector and controlling at least the second open position of each valve element;
- a first control loop for each fluid injector with feedback of the flow rate injected by the fluid injector, wherein the first control loop is configured for controlling the flow rate of the injected fluid by acting on the first control device configured for controlling at least the second open position of each valve element;

wherein the method comprises the steps of:
providing a dynamic equivalent model of the high-speed fluid injection system;
inputting a range of reference values of flow rate;
starting the fluid injection process;
the flowmeter linked to said fluid injector measuring, for each fluid injector, the value of the injected flow rate,
the first control device comparing, for each fluid injector, the measured value of flow rate with the range of reference values of flow rate;
  if the value of flow rate is outside the range of reference values of flow rate, the second open position of the valve element of the fluid injector is modified;
  if the value of flow rate is within the range of reference values of flow rate, no action is taken.

Throughout this document, it will be understood that amount of fluid refers either to a volume of fluid applied by the injection system or to the mass thereof, these two magnitudes being linked to one another by means of the density of the fluid; flow rate must be understood to be the temporary variation of the volume of fluid applied by the injectors, and preferably it will be the magnitude controlled by the method; in that sense, the value of the volume applied by an injector can be calculated by multiplying the flow rate by the injection time.

In the technical field of the invention, and therefore in the context of the invention, it will be understood that a dynamic model of the system is a set of transfer functions, values, and other similar entities which allow modeling the fluid injection system. More specifically, for a particular application system, and with a specific injector and fluid configuration, the dynamic equivalent model is obtained by evaluating the influence the second open position of the valve element, pressure, and temperature have on the flow rate, evaluating this influence in a combined manner for the control factors. The ranges of reference or control values as well as the speed in the increase or decrease of the control factors are therefore determined so as to obtain the desired values of flow rate and to be able to act thereon in the most optimal manner. The properties of the fluid are also taken into account for the dynamic equivalent model, since they are needed for translating the flow rate into values of dry extract mass or volume, or the required magnitudes depending on each type of application Therefore, for each application system and specific injector and fluid configuration, the system is provided with this dynamic equivalent model, since for certain desired applied product specifications, the range of reference values to be applied for each of the factors, as well as the influence thereof on the flow rate, may vary.

Technical, as well as safety, and/or energy efficiency limitations or aspects are also taken into account when providing the dynamic equivalent model because, in practice, the ranges of reference values can furthermore be restricted technically or for reasons of safety or energy efficiency.

Given that it would be required to wait for the solvents to volatilize completely in order to obtain the value of dry extract volume, delaying the control process in an unacceptable manner, the controlled magnitude is preferably the flow rate of the fluid injected by each injector; the applied volume can therefore be measured and controlled instantaneously and this flow rate measurement can be translated, if necessary, to a dry product volume through the proportion of the solvent and the density of the fluid and the density of the dry extract.

Fluid must be understood to be a substance in liquid phase which, in one embodiment, is a sealing product or fluid. In one embodiment, the sealing product is applied in liquid form and supplied to the injectors in a pressurized manner.

In one embodiment, the fluid injection system is rotary or stationary.

In one embodiment, the high-speed fluid injection system is rotary and has a cylindrical configuration with a plurality of injectors distributed along its side or periphery.

In one embodiment, the flowmeters are high-precision flowmeters, for example, electromagnetic flowmeters. In a particular embodiment, if more than one fluid injector requires a control action, a single control action is performed for each cycle or turn of the fluid injection system.

Advantageously, the flow rate feedback control allows controlling the amount of injected fluid in a continuous, quicker, and more precise manner than the control systems known in the state of the art. In particular, the individualized control of each injector allows correcting the flow rate injected by one of the injectors quickly without having to stop the injection process or modify the conditions of the other injectors, obtaining a greater speed of response and a greater homogeneity in the amount of applied fluid.

In a particular embodiment, the fluid feeding means further comprise pressure regulating means configured for modifying the fluid supply pressure, wherein the fluid injection system comprises a second control device, configured for receiving a signal of a range of reference values of the second open position of each fluid injector, and a narrower and more centered range within said range of reference values of the second open position, and for controlling the pressure regulating means;

and wherein if the value of the second open position of at least one fluid injector is outside the pre-established range of values, the method further comprises the step of:
modifying the fluid supply pressure.

Advantageously, controlling the pressure allows regulating the fluid supply pressure either to the assembly of injectors or individually to each injector, and thereby modifying, jointly or individually, the flow rate injected by the fluid injectors if one or more of the valve elements are outside a range of reference values which, in an example, can be the range of values in which the response of the injectors is effective and linear, or quasilinear, and is furthermore within the range of reference values of flow rate. Therefore, if the value of the second open position is a value which is outside the range of reference values, then the method comprises modifying the pressure, so in practice the valve elements will never be out of range.

In a particular embodiment, if the mean value of the second open position of all the fluid injectors is outside the narrower and more centered range of reference values, the method further comprises the step of:
modifying the fluid supply pressure.

Advantageously, modifying the supply pressure allows regulating, jointly or individually, the flow rate of the fluid injected by the injectors if the mean value of their open positions is above or below a range, preferably a narrow centered range of values within the mean value of the range of linear or effective behavior of the fluid injectors; the control of the valve element can therefore be maintained within the more advantageous range of values.

The use of a narrower and more centered range within the range of reference values of the second open position allows the second control device better control given that there is more leeway in both directions, i.e., for opening to both a greater and lesser extent.

In a particular embodiment, the fluid feeding means further comprise temperature regulating means configured for modifying the fluid supply temperature, and wherein the fluid injection system comprises a third control device;
wherein the third control device is furthermore configured for receiving a signal of the fluid supply pressure, a range of reference values of the fluid supply pressure, and for controlling the temperature regulating means;
wherein if the value of the fluid supply pressure is outside the range of reference values of the pressure, the method further comprises the step of:
modifying the fluid supply temperature by a first increase in temperature.

Advantageously, controlling the temperature allows regulating, jointly or individually, the fluid injection flow rate if the pressure is above or below the range of reference, thereby maintaining the pressure control within the more advantageous range of values. In that sense, if the value of the supply pressure is a value which is outside the range of reference values, then the method comprises modifying the temperature, so in practice the supply pressure will never be out of range.

In a particular embodiment, if the value of the fluid supply pressure is outside a second range of reference values that is narrower than the first range of values of the pressure, the method further comprises the step of:
modifying the fluid supply temperature by a second increase that is less than the first increase in temperature.

In a particular embodiment, the second range of reference values is centered on a value different from the first range of reference values.

Advantageously, establishing a narrower range of values allows performing more precise control actions for maintaining the value of the pressure close to the reference value.

In a particular embodiment, the valve element of the fluid injectors is a needle configured for being moved longitudinally, blocking a nozzle of the fluid injector, and wherein the control method further comprises the step of:
initializing each fluid injector by means of the steps of:
moving the end of stroke towards the closed position of the needle, such that the needle does not have any margin for movement,
moving the regulatable end of stroke towards the open position until fluid injection starts with the needle open,
moving the end of stroke towards the open position until reaching the midpoint of the control range determined for the second open position Advantageously, the valve element in the form of a needle allows regulating a range of injection flow rates by means of the amplitude of the longitudinal movement of the needle within its range of movement or stroke. This range of movement is fixed by a regulatable end of stroke or stop. Also advantageously, in this embodiment the method allows determining the end positions of the needle stroke which are used for determining the range of reference values of the end of stroke position of the needle, where the needle has an effective and linear, or quasilinear, influence on the injected flow rate.

In a particular embodiment, the first control device is furthermore configured for maintaining the open position within the mean value of the range of reference values of the open position.

Therefore, by being equidistant from the extreme values of the position of the valve element, a better control capacity is provided given that there is leeway in both directions, i.e., both for opening to a greater extent, i.e., higher flow rate, and for opening to a lesser extent, i.e., lower flow rate.

In a particular embodiment, the method comprises the use of a low-pass filter for filtering the measurement of the flowmeters. In one embodiment, the low-pass filter for filtering the measurement of the flowmeters is a weighted moving average filter.

Advantageously, the incorporation of a low-pass filter, and particularly a weighted moving average filter, allows eliminating interferences from the flow rate measurement and improving the stability of the control method.

In a second inventive aspect, the invention provides a high-speed fluid injection system configured for implementing a control method according to the first inventive aspect, comprising:
a plurality of fluid injectors, each fluid injector comprising a valve element movable between a first closing position and a second open position, wherein the second open position of each valve element can be individually controlled for regulating the flow rate injected by each fluid injector;

fluid feeding means configured for supplying pressurized fluid to the plurality of fluid injectors;

a plurality of flowmeters, wherein each flowmeter is linked to a fluid injector, and wherein each flowmeter is configured for measuring the flow rate of the fluid injected by the fluid injector to which it is linked;

a first control device, configured for receiving a signal of the flow rate of each fluid injector and for controlling at least the second open position of each valve element;

a first control loop with feedback of the flow rate injected by each fluid injector, wherein the first control loop is configured for controlling the flow rate of the fluid injected by the fluid injector by acting on the first control device configured for controlling at least the second open position of each valve element.

Advantageously, the fluid injection system comprises the elements required for implementing the control method of the first inventive aspect.

In one embodiment, the fluid injection system (1) is rotary or stationary.

In a particular embodiment, the fluid feeding means comprise pressure regulating means configured for modifying the fluid supply pressure, wherein the injection system comprises a second control device configured for controlling the fluid supply pressure, and wherein the system further comprises a second control loop, wherein the second control loop is configured for controlling at least the fluid supply pressure.

Advantageously, the pressure regulating means transform a pressure control signal into a physical variation of pressure in the fluid supply means. In a particular embodiment, the pressure regulating means act by means of constricting a valve, and in another embodiment by means of providing a compressed fluid. Also advantageously, the second control device allows regulating the injected flow rate by regulating a parameter other than the parameter regulated by the first control device.

In one embodiment, the second control device is physically attached to the first control device.

In a particular embodiment, the fluid feeding means further comprise temperature regulating means configured for modifying the fluid supply temperature, wherein the injection system comprises a third control device configured for controlling the temperature of the fluid by means of a signal for controlling the temperature of the fluid, and wherein the system further comprises a third control loop, wherein the third control loop is configured for controlling at least the temperature of the fluid.

Advantageously, the temperature control means transform a temperature control signal into a physical variation of the fluid temperature in the fluid supply means.

In one embodiment, the third control device is physically attached to the first and second control devices.

In one embodiment, the flowmeters and the control devices are arranged in a platform separated from the platform or support containing the injectors. Both platforms can move together or remain static depending on whether the application system is rotary or stationary.

In one embodiment, one or more of the control devices are arranged outside the platform containing the flowmeters and two or more of the components comprised in the high-speed fluid injection system communicate with one another wirelessly.

In a particular embodiment, the first control device comprises a proportional, integral, and/or derivative controller.

Advantageously, a PID controller allows establishing a stable and efficient feedback flow rate control loop.

In a particular embodiment, the valve element of the fluid injectors is a needle configured for being moved longitudinally, blocking a nozzle of the fluid injector.

Advantageously, a valve element in the form of a needle allows adjusting, with great precision, both the opening and the closing of the fluid injectors, and modifying, in an effective manner, the flow rate depending on the movement it performs.

In a particular embodiment, the pressure regulating means comprise a pressure regulating valve arranged in an inlet or an outlet of the fluid feeding means.

Advantageously, a pressure regulating valve allows easily and effectively controlling the fluid supply pressure.

In a particular embodiment, the temperature regulating means configured for regulating the temperature of the fluid comprise heated hoses and/or thermostatted tanks.

Advantageously, the heated hoses allow maintaining the temperature of the fluid as the fluid passes through the conduit; also advantageously, the thermostatted tanks allow maintaining the temperature of the fluid around a reference value.

In a third inventive aspect, the invention provides a monitoring system for an injection system according to the second inventive aspect, comprising a real-time monitoring device configured for transmitting at least the magnitudes measured by the injection system.

Advantageously, the monitoring system allows showing the values and magnitudes of the control system to an operator, such that the operator can receive information about the fluid injection process at all times.

In a particular embodiment, the system further comprises a gateway for the two-way transmission between the real-time monitoring device and display means for showing the data transmitted to an operator, and the encapsulation and decapsulation of data transmitted between the real-time monitoring device and the display means.

Advantageously, the gateway allows establishing a safe two-way communication; in particular it allows the input of reference values by an operator, as well as the viewing of the adjustment parameters and results.

In a particular embodiment, the real-time monitoring device is also configured for the block transmission of data recorded by the injection system.

Advantageously, the transmission of the set of values measured by the system allows the data to be used in a subsequent analysis performed by an external element, such as a computer.

All the features and/or method steps described in this specification (including the claims, description, and drawings) can be combined in any combination, with the exception of the combinations of such mutually exclusive features.

DESCRIPTION OF THE DRAWINGS

These and other features and advantages of the invention will become more apparent based on the following detailed description of a preferred embodiment given only by way of illustrative and non-limiting example in reference to the attached figures.

FIG. 1a This figure shows an embodiment of the control method with a flow rate feedback loop.

FIG. 1b This figure shows an embodiment of the control method with pressure control.

FIG. 1c This figure shows an embodiment of the control method with temperature control.

FIG. 5 This figure shows an embodiment of the stationary high-speed fluid injection system with pressure and temperature control.

FIG. 6a This figure shows another embodiment of the control method with a pressure flow rate feedback loop.

FIG. 6b This figure shows an embodiment of the control method of the preceding figure with temperature control.

DETAILED DESCRIPTION OF THE INVENTION

Control Method for Controlling Flow Rate by Means of Controlling the Second Open Position of the Valve Element (V), Pressure (P), and Temperature (T)

The present invention provides a precise and continuous control method for controlling the amount of fluid injected by a high-speed fluid injection system (1), using the flow rate (Q) of the injected fluid as a control variable.

Figure 2:
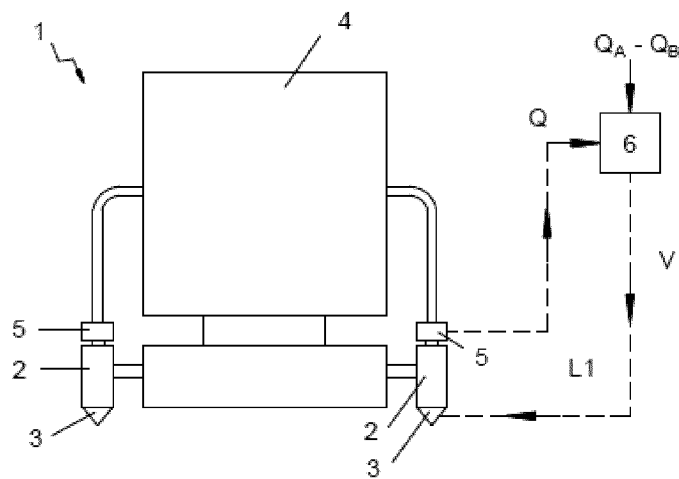
FIG. 2 This figure illustrates an embodiment of the rotary high-speed fluid injection system.

In the simplest embodiment of the invention, this is achieved by means of a rotary system (1) like the one shown in FIG. 2, comprising a control device (6), a plurality of regulatable fluid injectors (2) with their respective flowmeters (5), and fluid feeding means (4) supplying pressurized fluid, wherein the values of flow rate (Q) measured by the flowmeters (5) are compared with a given range of reference values of flow rate ($Q_A$-$Q_B$), and if the value of flow rate (Q) is outside the range of reference values ($Q_A$-$Q_B$), the control device (6) emits a control signal to the out-of-specification fluid injectors (2) to modify the final position (V) of the stroke of the needle (3) which has an effect on the flow rate (Q) of the injected fluid. The first control loop (L1) is thereby configured.

In the embodiment shown in FIG. 2, the rotary fluid injection system (1) comprises eight fluid injectors (2) with needles (3) as valve elements to restrict the passage of fluid. In a particular example, the fluid feeding means (4) are a pressurized tank supplying pressurized fluid.

The preferred type of injectors (2) comprises a needle valve (3) which deposits the fluid in the application area when it opens; the injector (2) is closed by means of this needle (3) which closes against a nozzle with a small-diameter opening (usually between 0.4 mm and 2.0 mm) when it moves downward. The needle (3), which is usually blocking the opening of the nozzle, moves (or is lifted) when the fluid is to be applied as a result of an actuator which can be, for example, a solenoid or pneumatic valve. The injector receives an opening signal when a part is detected in the application area, and remains open for the specific period of time required for ensuring a correct fluid application.

The maximum height to which the needle (3) is lifted upon receiving the opening signal is modified by means of the movement of a stop limiting the longitudinal movement of the needle, such that the stroke of the needle (3) can be regulated. The free distance between the end of the needle (3) and the nozzle therefore depends on the length of the stroke of the needle, and accordingly the effective section of the nozzle regulating the amount of fluid that is injected.

In practice, for each injector configuration in which the type of needle and the type of nozzle can be varied, the range of the stroke of the needle in which the lifting of the needle has an effective influence on the flow rate of the applied fluid and in which the response is linear or quasilinear must be determined.

The mechanisms used for adjusting the end of stroke of the needle in these injectors include movable stops that are adjusted manually or by means of motors such as, for example, by means of stepped motors arranged in the injectors (2) themselves. The motors allow the adjustment of the maximum lifting of the needle to be controlled remotely.

For many needle—nozzle configurations, variation in the stroke of the needle (3) only has an influence on the injected flow rate (Q) in the range of 0 to 1.50 mm; beyond this range, the lifting of the needle (3) has no influence on the amount of applied fluid. The most common injectors in the industry would have a stroke equivalent to about ten passes, giving rise to the range of [25, 35] within which the injector (2) can be effectively controlled.

Figure 8:
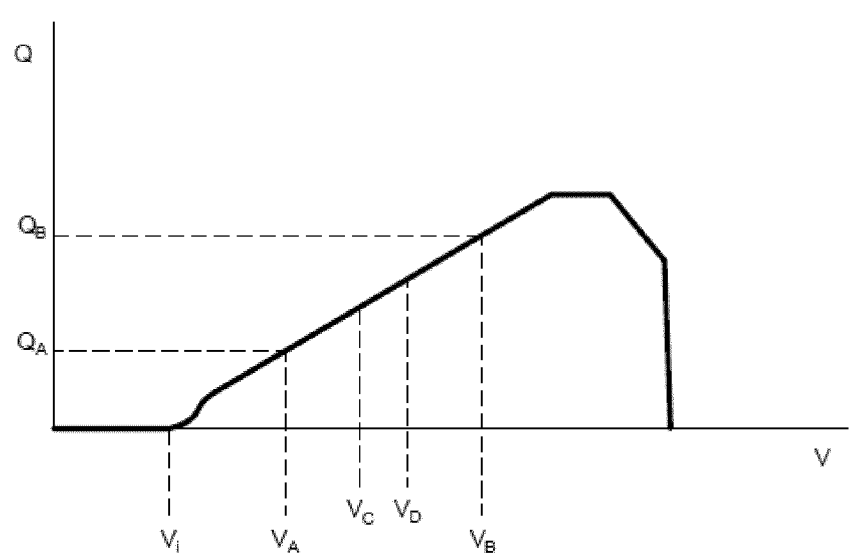
FIG. 8 This figure shows a graph of the flow rate evolution based on the second open position of the valve element for one embodiment.

FIG. 8 shows the graph of flow rate (Q) evolution based on the second open position (V) of the valve element (3) for the case in which the injector (2) is a solenoid-activated needle injector, the solenoid itself being the end of stroke. This type of injector is the most commonly used in the industry.

It can be seen in said graph that, with the end of stroke in the lowermost part, there is no flow rate (Q=0). Then, after the needle has been lifted to a certain point (V), flow is still not obtained (Q=0), given that the needle has not been lifted sufficiently.

Subsequently, after exceeding the lifting point $V_j$, the flow rate (Q≠0) starts to flow, i.e., it is the needle position (V) in which it already has an influence on the flow rate (Q). In that area, the flow is still uncertain and unstable, as seen in FIG. 8.

By lifting the needle (V) further, the area where the response is effective, i.e., has an influence on the flow rate (Q), and is quasilinear, is reached. It is verified that the range of flow rate $Q_A$-$Q_B$, corresponding to the flow rate specifications for the particular application process is within this response area, and the range of reference values $V_A$-$V_B$ which corresponds to or is within the response area $Q_A$-$Q_B$ is selected.

In a particular case, a narrower and more centered range of reference values $V_C$-$V_D$ within the range of reference values $V_A$-$V_B$ is selected.

At very high values of the needle lifting position (V), the flow rate (Q) is stabilized and even drops because, since the solenoid itself is the end of stroke, it will no longer be capable of exerting any influence to lift the needle when it is very far away from it. In this area, the system is saturated or does not provide any response.

In that sense, the system is unstable for values below the effective and quasilinear response area, and the system is saturated for values above same. For this reason, the range $V_A$-$V_B$ is selected within this area as the range of effective value control. The slope of the curve comprised in area $V_A$-$V_B$ determines the instructions or speed that applies when the needle position (V) is acted on to obtain a desired variation in the flow rate (Q). When the dynamic equivalent model is obtained, the evaluation of the influence of pressure (P) and temperature (T) on the flow rate (Q) is also similarly performed with the same objective, determining the ranges of reference values, as well as the instructions of increasing and reducing these control parameters.

The sealing fluid is supplied to the injectors by means of a pump or a pressurized tank (4), such that the injectors (2) receive a fluid supply that is constant and at a pressure greater than atmospheric pressure.

Generally, the amount of injected fluid can be expressed in the form of injected flow rate (Q), being a function of the output speed of the fluid at the outlet of the injectors (2); the output speed of the fluid depends, among other factors, on:
  Supply pressure (P): the higher the pressure, the higher the output speed.
  The effective section and inner geometry of the nozzle: the larger the effective section of the outlet opening and the greater the inner volume of the nozzle, the higher the speed.
  Height of the needle (V): the higher the needle or stroke, the higher the speed.
  Viscosity of the fluid: the lower the viscosity of the fluid, the higher the output speed.

For an injection process with a fixed injector opening time, the output speed of the fluid must be modified to regulate the amount to be applied. In a process that is under control, fluid viscosity and nozzle configuration are fixed parameters, and therefore needle height (V), pressure (P), and temperature (T) are regulated to adjust the amount of fluid to be applied. An increase in pressure (P), and/or needle height (V), and/or temperature (T) will increase the amount of applied fluid, whereas a reduction in pressure (P), and/or a reduction in the stroke of the needle (V) and/or the temperature (T) will cause a reduction in the injected flow rate.

In practice, viscosity is not always fixed since the composition of the fluid may vary between batches and products, and furthermore the temperature (T) of the fluid affects the viscosity of most fluids. Moreover, components of the injectors (2), such as the nozzle, may experience wear over time and affect the output speed of the fluid.

FIG. 1a shows a diagram of the simplest embodiment of the first control loop (L1) of the system (1); this embodiment comprises a first control loop (L1) of the injected flow rate with feedback of the flow rate (Q). This loop (L1) is implemented by means of a plurality of PID controllers, one for each fluid injector (2), and depicted as part of the first control device (6).

A signal of the flow rate (Q) coming from the corresponding flowmeter (5) is fed to each controller (6) of the plurality of PID controllers, and this signal is compared with the given range of reference values of flow rate ($Q_A$-$Q_B$), and if the value of flow rate (Q) is below the range of reference values ($Q_A$-$Q_B$), the controller (6) emits a signal to activate the mechanism of the injector (2) which moves the end of stroke of the needle (3) the required distance, such that it increases the stroke of the needle. For the particular case in which the mechanism of the injector (2) is a stepped motor, the controller (6) emits a signal to activate the stepped motor of the injector (2) which moves the end of stroke of the needle (3) the distance equivalent to a step of the motor.

In contrast, if the flow rate measurement is above the range of reference ($Q_A$-$Q_B$), the controller (6) emits a signal to close the end of stroke of the needle (3) or to move it closer to the nozzle of the injector (2), reducing the stroke of the needle.

The step-wise values of movement (V) of the needle (2) are not absolute, so there is a need to establish the step-wise values between which the needle (3) allows the outflow of the fluid and from which the flow rate no longer increases so as to obtain the control band of the system. Within this control band, the value of the lifting (V) of the needles (3) being in the intermediate position of the range is prioritized by the controller (6), as long as the process allows same. It is therefore less likely for a control action to bring the needle (3) to the limit of the control range. Both for that shown in FIG. 1a and in any of the described embodiments, the PID controllers can be physical devices arranged in communication with the actuator of the injectors (2), or virtual devices implemented by one or more control devices (6), for example, by means of a computer or a programmable automaton which implements eight control loops with their respective inputs and outputs.

FIG. 1b shows an improvement of the preceding embodiment of the first control loop (L1), in which the system (1) comprises a second control loop (L2) for regulating the pressure (P) of the system (1). In this embodiment, the system (1) comprises a second control device (6.1) which is fed with the set of values of the second open position (V) of the needles (3) of all the injectors (2). If the second control device (6.1) detects that one of the values of the second position (V) of the needles (3) is outside the control range of reference values $V_A$—$V_B$, the control device (6.1) emits a control signal to the pressure regulating means (7) to modify the fluid supply pressure (P); this variation results in the variation of the output speed of the fluid of the injectors (2), which is equivalent to modifying the injection flow rate (Q).

A control of the flow rate (Q) is thereby implemented for the cases in which the regulation of the injectors (2) is not possible.

Another capacity of the second control loop (L2) is to determine whether the mean of the values of the second open position (V) is outside a narrower centered range of reference values $V_C$-$V_D$ within the value of the open position (V). If this condition is met, the second control device (6.1) emits a signal to modify the fluid supply pressure (P) and force a correction of the open positions (V) in the sense of causing the mean to approach the mean value of the range.

The second control device (6.1) can be implemented by means of an industrial computer, a programmable automaton, or a similar device. In an embodiment that is not shown, the physical device corresponding to the second control device (6.1) is the same as the physical device in which the first control device (6) is implemented. In turn, the pressure regulating means (7) are conventional means for regulating the pressure of fluids, such as controlled valves.

FIG. 1c shows another embodiment in which a third control loop (L3) is added to the embodiment shown in FIG. 1b. In this embodiment, the system (1) includes a third control device (6.2) which is fed with a value of the supply pressure (P). If the supply pressure (P) is outside a range of reference values of pressure ($P_A$-$P_B$), the third control device (6.2) emits a control signal to the temperature regulating means (9) to modify the temperature (T). A variation in the temperature (T) will affect the viscosity of the fluid, the speed of which will in turn be modified; the third control loop (L3) therefore allows modifying the injected flow rate (Q).

The third control device (6.2) can be implemented by means of an industrial computer, a programmable automaton, or a similar device. In an embodiment that is not shown, the physical device corresponding to the third control device (6.2) is the same as the physical device in which the first control device (6) and second control device (6.1) are implemented. In turn, the temperature regulating means (9) are conventional means for regulating temperature, such as heated hoses or thermostatted tanks.

Figure 3:
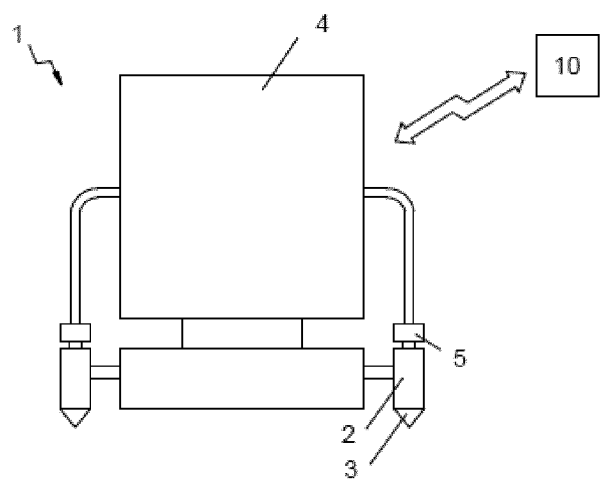
FIG. 3 This figure shows an embodiment of the monitoring system.

FIG. 3 shows an embodiment of the monitoring system (10). The purpose of this monitoring system (10) is to record operation data of the control method from the system (1) and to send said data securely to a user, such that this information can then be processed. In addition to the real-time presentation of control variable-related information, such as the position (V) of each needle (3), pressure (P), and supply temperature (T), failure alarms, etc., the monitoring system (10) allows the user to modify the reference values of any of the variables or manually cancel some or all the control loops. In this sense, the monitoring system (10) comprises a gateway to ensure a secure two-way communication.

Figure 4:
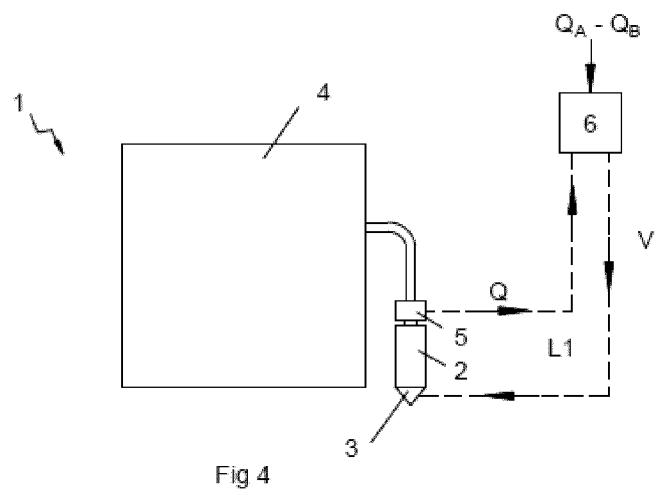
FIG. 4 This figure shows an embodiment of the stationary high-speed fluid injection system.

Unlike the embodiment shown in FIG. 2 in which the fluid injection system (1) was a rotary system, the fluid injection system (1) in FIG. 4 is stationary. In this embodiment, the system comprises one or more fixed injectors (2) and the lids are those that move in an indexed manner, remaining in the application station for the corresponding time to be treated by the injector (2). The system comprises a first control loop (L1) configured for controlling the flow rate of the injected fluid by acting on the first control device (6) configured for controlling at least the second open position (V) of each valve element.

FIG. 5 shows an embodiment that is improved with respect to that shown in FIG. 4, in which a second control loop (L2) configured for controlling at least the fluid supply pressure and a third control loop (L3) configured for controlling the fluid supply temperature are included.

With the exception of those incompatible or mutually exclusive embodiments, all the features indicated above for the rotary injection system are applicable to this stationary injection system.

Control Method for Controlling Flow Rate by Means of Controlling Pressure (P) and Temperature (T)

The invention also provides a precise and continuous control method for controlling the amount of fluid injected by a high-speed fluid injection system (1), when the flow rate (Q) of the injected fluid cannot be controlled remotely by means of fluid injectors (2), i.e., when the flow rate (Q) cannot be controlled by means of controlling the second open position of the valve element (V) of the fluid injectors (2) remotely.

Figure 7A:
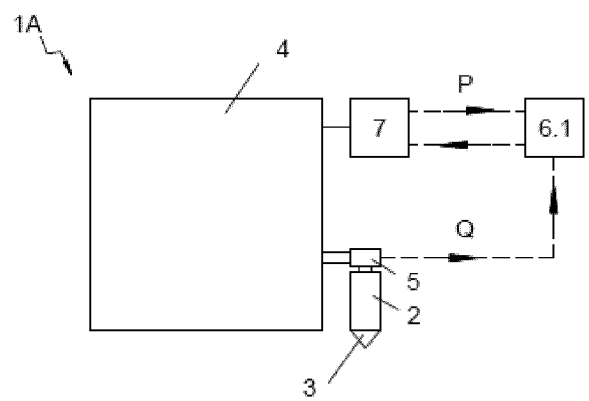
FIG. 7a This figure illustrates another embodiment of the stationary high-speed fluid injection system FIG. 7b This figure shows an embodiment of the stationary fluid injection system of the preceding figure with additional temperature control.

In the simplest embodiment of the invention, this is achieved by means of a system (1A) like the one shown in FIG. 7a, comprising a control device (6.1), a plurality of non-regulatable fluid injectors (2) with respective flowmeters (5), and fluid feeding means (4) supplying pressurized fluid, wherein the values of flow rate (Q) measured by the flowmeters (5) are compared with a given range of reference values of flow rate ($Q_A$-$Q_B$), and if the value of flow rate (Q) is outside the range of reference values ($Q_A$-$Q_B$), the control device (6.1) emits a control signal to the pressure regulating means (7) to modify the fluid supply pressure to the fluid injectors (2), which has an effect on the flow rate (Q) of the injected fluid. The first control loop (L1*) is thereby configured.

Figure 7B:
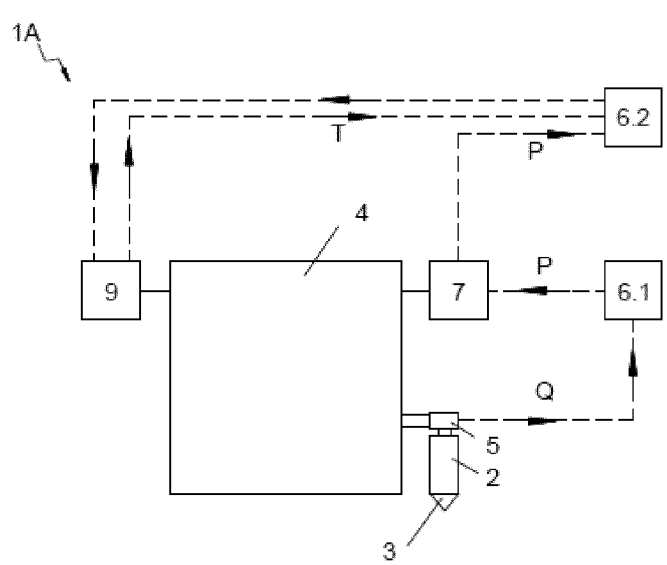

FIG. 7b shows an improvement of the preceding embodiment, in which a second control loop (L2*) is added to the embodiment shown in FIG. 6a. In this embodiment, the system (1A) includes a second control device (6.2) which is fed with a value of supply pressure (P). If the supply pressure (P) is outside a given range of reference values of pressure ($P_A$-$P_B$), the second control device (6.2) emits a control signal to the temperature regulating means (9) to modify the temperature (T). A variation in the temperature (T) will affect the viscosity of the fluid, the speed of which will in turn be modified; the second control loop (L2*) therefore allows modifying the injected flow rate (Q). The configuration of this second control loop (L2*) is shown in FIG. 7b.

Similarly, all the features indicated in the preceding embodiments for the control method for controlling flow rate by means of controlling the second open position of the valve element (V), pressure (P), and temperature (T) are applicable to the present control method for controlling flow rate by means of controlling pressure (P) and temperature (T), with the exception of those incompatible or mutually exclusive embodiments.

Results of Experimental Data—Control Method for High-Speed Control of Flow Rate by Means of Controlling the Second Open Position of the Valve Element (V) and Pressure (P).

The results of experimental data explained below and showed in FIGS. 9 and 10 correspond to the embodiment of the invention by means of a rotary system (1) like the one shown in FIG. 5 without the control for the Temperature, that is to say, only by means of controlling the second open position of the valve element (V) and the pressure (P). FIG. 1b shows the control loops of this embodiment of the system (1).

The tests were carried out on a water-based sealant application equipment for metal packaging caps. The application equipment is a rotary type machine with 8 regulatable fluid injectors (application guns) that applies water-based sealant to 2100 caps per minute, being the application time per cap of 50 ms.

The dry weight specification of the water-based sealant applied is 19 mg at the lower limit and 29 mg at the upper limit.

As shown in FIGS. 5 and 1b, the application equipment comprises a control device (6), eight regulatable fluid injectors (2) with their respective flowmeters (5), and a pressurized tank (4) supplying pressurized fluid (water-based sealant), wherein the values of flow rate (Q) measured by the flowmeters (5) are compared with a given range of reference values of flow rate ($Q_A$-$Q_B$), and if the value of flow rate (Q) is outside the range of reference values ($Q_A$-$Q_B$), the control device (6) emits a control signal to the out-of-specification fluid injectors (2) to modify the final position (V) of the stroke of the needle (3) which has an effect on the flow rate (Q) of the injected fluid. The first control loop (L1) is thereby configured.

In addition to the first control loop (L1), this embodiment of the system (1) comprises a second control loop (L2) for regulating the pressure (P) of the system (1). In this embodiment, the system (1) comprises a second control device (6.1)

which is fed with the set of values of the second open position (V) of the needles (3) of all the injectors (2). If the second control device (6.1) detects that one of the values of the second position (V) of the needles (3) is outside the control range of reference values $V_A$—$V_B$, the control device (6.1) emits a control signal to the pressure regulating means (7) to modify the fluid supply pressure (P); this variation results in the variation of the output speed of the fluid of the injectors (2), which is equivalent to modifying the injection flow rate (Q).

With this embodiment, a control of the flow rate (Q) is thereby implemented for the cases in which the regulation of the injectors (2), that is to say, the regulation of the final position (V) of the stroke of the needle (3), is not possible.

The results show the capability analysis of the high-speed application process with the traditional control versus the application process using the above detailed embodiment of the control method and the system of the present invention.

Figure 9:
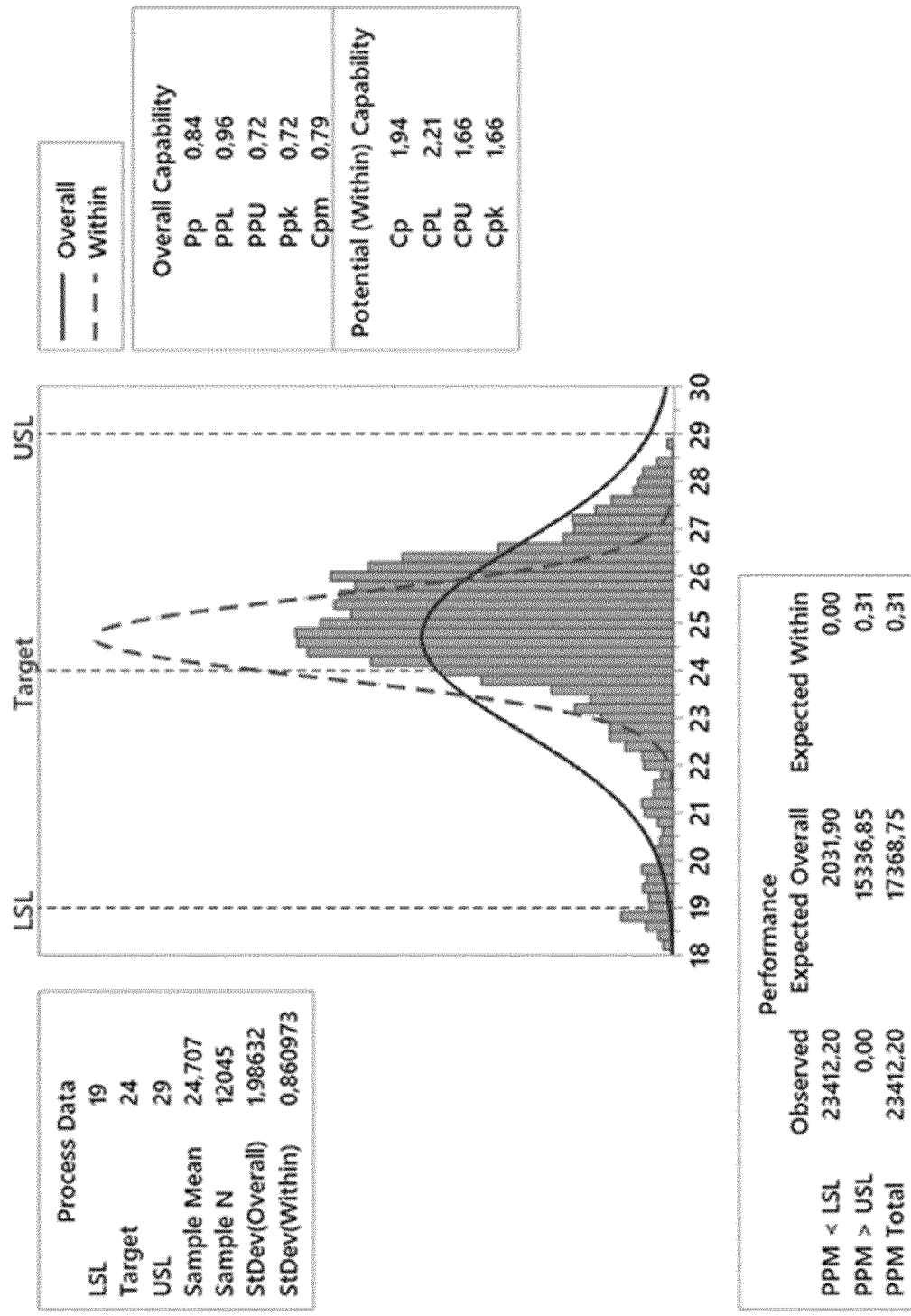
FIG. 9 This figure shows the capability of the fluid application process with a traditional system.
Figure 10:
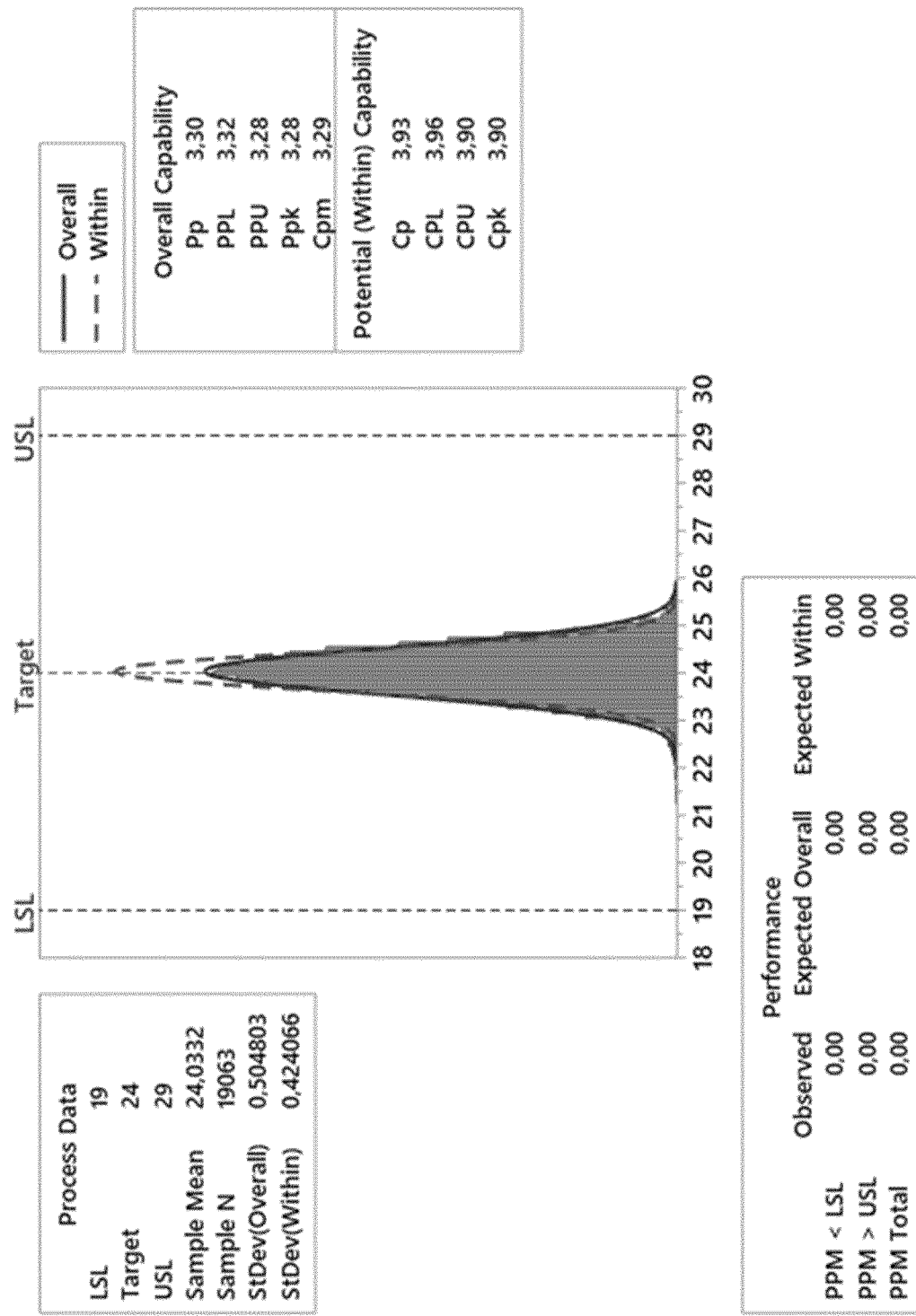
FIG. 10 This figure shows the capability of the fluid application process with the method and system of the simplest embodiment of the invention.

In FIGS. 9 and 10, the following parameters are used:
LSL=Lower Specification Limit (dry weight specification of the water-based sealant applied)
USL=Upper Specification Limit (dry weight specification of the water-based sealant applied)
Sample N=Sample number
PPM=Defects Part Per Million
Pp, PpL, PpU, Ppk and Cpm=Overall Process capability indices
Cp, CpL, CpU and Cpk=Potential process capability indices.

More specifically:
Cp or Pp=(USL-LSL)/6*StDev→<1 means: The process is narrower than the set limits
CPU or PPU=(USL-Target)/3*StDev→<1 means: The upper limit is exceeded
CPL or PPL=(Target-LSL)/3*StDev→<1 means: The lower limit is exceeded
Cpk or Ppk=min{CPU, CPL}→<1 means: The process breaches at least one of the limits Further, following the Six Sigma standards of the industry (Six Sigma comes from statistics, specifically from the field of statistical quality control, which evaluates process capability.):
Ppk<1 Process out of control, not centered and out of the specifications
PpK>2 World class process with six sigma quality.

Thus, FIG. 9 show the capability analysis of the high-speed application process with the traditional control and FIG. 10 shows the capability analysis of the high-speed application process using the control method and the system of the mentioned embodiment.

As shown in FIG. 9, the long-term capability index Ppk for the application process is 0.72. This Ppk index indicates that the process is out of control resulting in a high rate of defective (out of specification) parts with a PPM of 23412.20, which means that, for every million caps applied, more than 23000 caps are defective.

However, as can be seen in FIG. 10, by applying the control method and the system of the above mentioned embodiment of present invention, it is possible to considerably improve the capability of the application process by greatly reducing the variability of applied weights (fluids), increasing the Ppk to 3.28, and lowering the rate of defective parts to 0.

What is claimed is:

1. A control method for controlling the amount of fluid applied on a container component surface by a high-speed fluid injection system, the high-speed fluid injection system comprising:
    a plurality of fluid injectors configured to apply fluid on a container component surface, each fluid injector comprising a valve element movable between a first closing position and a second open position, wherein the second open position of each valve element can be individually controlled to regulate the flow rate injected by each fluid injector;
    fluid feeding means configured for supplying pressurized fluid to the plurality of fluid injectors;
    a plurality of flowmeters, wherein each flowmeter is linked to a fluid injector, and wherein each flowmeter is configured for measuring the flow rate of the fluid injected by the fluid injector to which it is linked;
    a first control device, configured for receiving a signal of the flow rate of each fluid injector and controlling at least the second open position of each valve element; and
    a first control loop for each fluid injector with feedback of the flow rate injected by the fluid injector, wherein the first control loop is configured for controlling the flow rate of the injected fluid by acting on the first control device configured for controlling at least the second open position of each valve element;
wherein the method comprises the steps of:
    providing a dynamic equivalent model of the high-speed fluid injection system;
    inputting a range of reference values of flow rate;
    starting the fluid injection process;
    the flowmeter linked to said fluid injector measuring, for each fluid injector, the value of the injected flow rate,
    the first control device (6) comparing, for each fluid injector, the measured value of flow rate with the range of reference values of flow rate;
    if the value of flow rate is outside the range of reference values of flow rate, the second open position of the valve element of the fluid injector is modified; and
    if the value of flow rate is within the range of reference values of flow rate, no action is taken.

2. The control method for a fluid injection system according to claim 1, wherein the fluid injection system is rotary or stationary.

3. The control method for a fluid injection system according to claim 2,
    wherein the fluid feeding means further comprise pressure regulating means configured for modifying the fluid supply pressure,
    wherein the fluid injection system comprises a second control device, configured for receiving a signal of a range of reference values of the second open position of each fluid injector, and a narrower and more centered range within said range of reference values of the second open position, and for controlling the pressure regulating means, and
    wherein if the value of the second open position of at least one fluid injector is outside the range of reference values of the second open position, the method further comprises the step of:
        modifying the fluid supply pressure.

4. The control method for a fluid injection system according to claim 3, wherein if the average value of the second open position of all the fluid injectors is outside the narrower and more centered range of reference values, the method further comprises the step of:
modifying the fluid supply pressure.

5. The control method for a fluid injection system according to claim 3,
wherein the fluid feeding means further comprise temperature regulating means configured for modifying the fluid supply temperature,
wherein the fluid injection system comprises a third control device,
wherein the third control device is furthermore configured for receiving a signal of the fluid supply pressure, a range of reference values of the fluid supply pressure, and for controlling the temperature regulating means, and
wherein if the value of the fluid supply pressure is outside the range of reference values of the pressure, the method further comprises the step of:
modifying the fluid supply temperature by a first increase in temperature.

6. The control method for a fluid injection system according to claim 1, wherein the valve element of the fluid injectors is a needle configured for being moved longitudinally, blocking a nozzle of the fluid injector, and wherein the second open position of the valve element is determined by a regulatable end of stroke, and wherein the control method further comprises the step of:
initializing each fluid injector by the steps of:
moving the end of stroke towards the closed position of the needle, such that the needle does not have any margin for movement,
moving the regulatable end of stroke towards the open position until fluid injection starts with the needle open, and
moving the end of stroke towards the open position until reaching the midpoint of the control range determined for the second open position.

7. The control method for a fluid injection system according to claim 1, comprising the use of a low-pass filter for filtering the measurement of the flowmeters.

8. A high-speed fluid injection system configured for implementing a control method for controlling the amount of fluid applied on a container component surface, the high-speed fluid injection system comprising:
a plurality of fluid injectors configured to apply fluid on a container component surface, each fluid injector comprising a valve element movable between a first closing position and a second open position, wherein the second open position of each valve element can be individually controlled for regulating the flow rate injected by each fluid injector;
fluid feeding means configured for supplying pressurized fluid to the plurality of fluid injectors;
a plurality of flowmeters, wherein each flowmeter is linked to a fluid injector, and wherein each flowmeter is configured for measuring the flow rate of the fluid injected by the fluid injector to which it is linked;
a first control device, configured for receiving a signal of the flow rate of each fluid injector and controlling at least the second open position of each valve element; and
a first control loop with feedback of the flow rate injected by each fluid injector, wherein the first control loop is configured for controlling the flow rate of the fluid injected by the fluid injector by acting on the first control device configured for controlling at least the second open position of each valve element.

9. The high-speed fluid injection system according to claim 8, wherein the fluid injection system is rotary or stationary.

10. The high-speed fluid injection system according to claim 9, wherein the fluid feeding means comprise pressure regulating means configured for modifying the fluid supply pressure, wherein the injection system comprises a second control device configured for controlling the fluid supply pressure, and wherein the system further comprises a second control loop, wherein the second control loop is configured for controlling at least the fluid supply pressure.

11. The high-speed fluid injection system according to claim 8, wherein the fluid feeding means further comprise temperature regulating means configured for modifying the fluid supply temperature, wherein the injection system comprises a third control device configured for controlling the temperature of the fluid by means of a signal for controlling the temperature of the fluid, and wherein the system further comprises a third control loop, wherein the third control loop is configured for controlling at least the temperature of the fluid.

12. The high-speed fluid injection system according to claim 8, wherein the first control device comprises a proportional, integral, and/or derivative controller.

13. The high-speed fluid injection system according to claim 8, wherein the valve element of the fluid injectors is a needle configured for being moved longitudinally, blocking a nozzle of the fluid injector.

14. A monitoring system for the high-speed fluid injection system according to claim 8, the monitoring system comprising a real-time monitoring device configured for transmitting at least the magnitudes measured by the injection system.

15. The monitoring system according to claim 14, further comprising a gateway for two-way transmission between the real-time monitoring device and a display means for showing the data transmitted to an operator, and encapsulation and decapsulation of data transmitted between the real-time monitoring device and the display means.

* * * * *